(12) United States Patent
Meng

(10) Patent No.: US 10,499,344 B2
(45) Date of Patent: Dec. 3, 2019

(54) UPLINK POWER CONTROL USING BEAMFORMING TO COMPENSATE FOR PATH LOSS

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/396,759

(22) Filed: Apr. 28, 2019

(65) Prior Publication Data

US 2019/0253979 A1  Aug. 15, 2019

Related U.S. Application Data

(63) Continuation of application No. 15/871,089, filed on Jan. 15, 2018, now Pat. No. 10,321,412.

(Continued)

(51) Int. Cl.
*H04W 52/14* (2009.01)
*H04W 16/28* (2009.01)
*H04W 52/24* (2009.01)
*H04B 7/06* (2006.01)
*H04B 17/10* (2015.01)
*H04L 5/00* (2006.01)
*H04W 52/12* (2009.01)
*H04W 52/32* (2009.01)

(Continued)

(52) U.S. Cl.
CPC ........ *H04W 52/242* (2013.01); *H04B 7/0617* (2013.01); *H04B 17/104* (2015.01); *H04L 5/0048* (2013.01); *H04W 16/28* (2013.01); *H04W 52/12* (2013.01); *H04W 52/146* (2013.01); *H04W 52/325* (2013.01); *H04W 88/02* (2013.01); *H04W 88/08* (2013.01)

(58) Field of Classification Search
CPC .. H04B 7/0626; H04B 7/0456; H04B 7/0478; H04B 7/0617; H04B 7/0639; H04B 7/024; H04B 7/0413; H04B 7/0469; H04B 7/0632; H04B 7/0408; H04B 7/0417; H04B 7/0452; H04B 7/06; H04B 7/063; H04B 7/0404; H04W 52/146; H04W 52/42; H04W 52/242; H04W 52/246; H04W 16/28; H04W 52/08; H04W 52/10; H04W 52/247; H04W 52/248
USPC .............................................. 455/522, 562.1
See application file for complete search history.

(56) References Cited

U.S. PATENT DOCUMENTS 10,321,412 B2 * 6/2019 Meng ................. H04W 52/325
2008/0227477 A1   9/2008 Dayal
(Continued)

OTHER PUBLICATIONS

3GPP TS 38.213 V1.1.1, Nov. 2017.
Search Report dated Jul. 11, 2018 for EP application No. 18152900. 9, pp. 1-4.

*Primary Examiner* — Philip Sobutka
(74) *Attorney, Agent, or Firm* — Winston Hsu

(57) ABSTRACT

The technique of beamforming is to be adopted in 5G NR systems in both DL and UL directions to combat the effect of acute path loss in the Giga hertz frequency region. With beamforming, the measured path loss in the UL and DL directions will be different even if the same carrier frequency is used for both DL and UL, due to the fact that the antenna gains are not unity as in the case in LTE/LTE-A systems. In view of this, embodiments of the present invention provide method and apparatus to handle the mechanism of UL transmit power control.

7 Claims, 3 Drawing Sheets

Transmit antenna configuration $G_t^{DL}$

Base Station

Downlink(DL)reference signal →

Receive antenna configuration $G_r^{DL}$

UE

← Uplink(UL) signal

Receive antenna configuration $G_r^{UL}$

Transmit antenna configuration $G_t^{UL}$

Related U.S. Application Data

(60) Provisional application No. 62/475,816, filed on Mar. 23, 2017.

(51) Int. Cl.
*H04W 88/02* (2009.01)
*H04W 88/08* (2009.01)

(56) References Cited

U.S. PATENT DOCUMENTS

| | | |
|---|---|---|
| 2014/0185481 A1 | 7/2014 | Seol |
| 2014/0295909 A1* | 10/2014 | Ouchi ................. H04W 52/242 455/522 |
| 2014/0315594 A1 | 10/2014 | Jeong |
| 2016/0135180 A1 | 5/2016 | Yuan |
| 2016/0205633 A1 | 7/2016 | Mizusawa |
| 2016/0212643 A1 | 7/2016 | Park |

* cited by examiner

UPLINK POWER CONTROL USING BEAMFORMING TO COMPENSATE FOR PATH LOSS

CROSS REFERENCE TO RELATED APPLICATIONS

This application is a continuation application of U.S. application Ser. No. 15/871,089, filed on Jan. 15, 2018, which claims the benefit of U.S. Provisional Application No. 62/475,816, filed on Mar. 23, 2017. The entire contents of the related applications are incorporated herein by reference.

BACKGROUND OF THE INVENTION

1. Field of the Invention

The present invention relates to transmit power control, and more particularly, to methods and apparatus for performing transmit power control in next-generation cellular communications systems, such as 5G New Radio system.

2. Description of the Prior Art

Path loss (PL) is the phenomenon that the electromagnetic signals attenuate when propagating from the transmitter to the receiver. The formula for path loss is widely known and can be given as:

$$PL = \frac{P_r}{P_t} = G_t G_r \left(\frac{\lambda}{4\pi d}\right)^2$$

where $P_t$ and $P_r$ represent the transmit and the receive power respective, $G_t$ and $G_r$ represent the transmit and receive antenna gains in linear value respectively, $\lambda$ is the wavelength, and d is the distance between the transmitter and the receiver. It can be observed that, as long as the transmitter and the receiver both use unity-gain, omnidirectional antennas, the path loss between the transmitter and the receiver depends only on the wavelength. In other words, the magnitude of "PL" can be considered the same for both the DL and UL directions if the operating frequencies of DL and UL are not too far apart. This is the case in most existing cellular communication systems, including LTE/LTE-A, where a user equipment (UE) estimates the PL by measuring how much a known cell-specific reference signal attenuates when it is received. The UE then accounts for the factor of PL by increasing its transmit power by the same magnitude when performing UL transmissions.

In cellular communication systems, uplink (UL) power control is a technique for the UEs to adjust the transmit power toward the base station in order to maintain a desired power level. The purpose of UL power control is many-fold, including the already-mentioned compensation for path loss, causing less interference to other UEs, guaranteeing a certain transmission error performance, and lowering the power consumption. In LTE/LTE-A systems, the mechanism of UL power control consists of both an open-loop (OL) component and a closed-loop (CL) component. Details of the UL power control mechanism can be found in a released document: ""Physical Layer Procedures," 3GPP TS 36.213, V14.1.0, 2017-01".

In 5G new radio (NR) systems, it has been agreed that the UL power control mechanism also supports both an open-loop part based on path loss estimate, and a closed-loop part based on network signaling. In general, the 5G NR system reuses many of the design principles in LTE/LTE-A systems; yet at the same time introduces a few new features. Some of the features, including supporting different numerologies, different UL waveforms, and beamforming-based system access, could potentially impact the UL power control mechanism as specified for the LTE/LTE-A systems.

Different numerologies will be supported in 5G NR systems, including different subcarrier frequency spacing, and different OFDM symbol duration. A scheduling unit is defined as the smallest time frequency resource used for scheduling one DL or one UL transmission for a UE. The number of resource elements in a scheduling unit is expected to be the same across different numerologies. Both discrete Fourier transform (DFT)-spread OFDM and cyclic prefix (CP)-OFDM for UL transmissions are both supported in 5G NR systems.

Carrier frequencies range from several MHz to as high as 60 GHz will be supported in 5G NR systems. As can be observed in the path loss formula, the path loss worsens along with decreasing wavelength, or equivalently, with increasing carrier frequency. It thus follows that for 5G NR systems deployed in the frequency range close to 60 GHz, the effect of path loss is a big challenge to the system design. Antenna arrays that achieves a high transmit antenna gain as well as a high receive antenna gain, or the beamforming gain, have been proposed to be supported in the 5G NR systems as a building block right from the beginning. This implies that the fundamental system information as well as cell-specific reference signals are all transmitted using beamformed signals with antenna gains larger than 1, for both DL and UL directions.

SUMMARY OF THE INVENTION

It is one objective of the present invention to provide methods and apparatus for determine and performing uplink power control in next-generation cellular communications systems, such as 5G New Radio system. Since the next-generation cellular adopts the beamforming technology, embodiments of the present invention relies on calculations on antenna gains of antenna configuration to determine the uplink transmit power.

According to one embodiment, a method for a user equipment (UE) to perform uplink transmit power control is provided. The UE comprises: receiving, from a base station, a control information comprising at least an antenna configuration; determining uplink transmit power of at least one uplink signal based on at least the control information; and transmitting the at least one uplink signal with the determined uplink transmit power to the base station.

According to one embodiment, a user equipment (UE) is provided. The UE comprises: a communication interfacing unit; a storage unit and a processing circuit. The communication interfacing unit is arranged to receive, from a base station, control information comprising at least an antenna configuration. The storage unit is arranged to store program code. The processing circuit is arranged to execute the program code thereby to perform steps of determining uplink transmit power of at least one uplink signal based on at least the control information, wherein the communication interfacing unit is arranged to transmit the at least one uplink signal with the determined uplink transmit power to the base station.

These and other objectives of the present invention will no doubt become obvious to those of ordinary skill in the art

DETAILED DESCRIPTION

Figure 1:
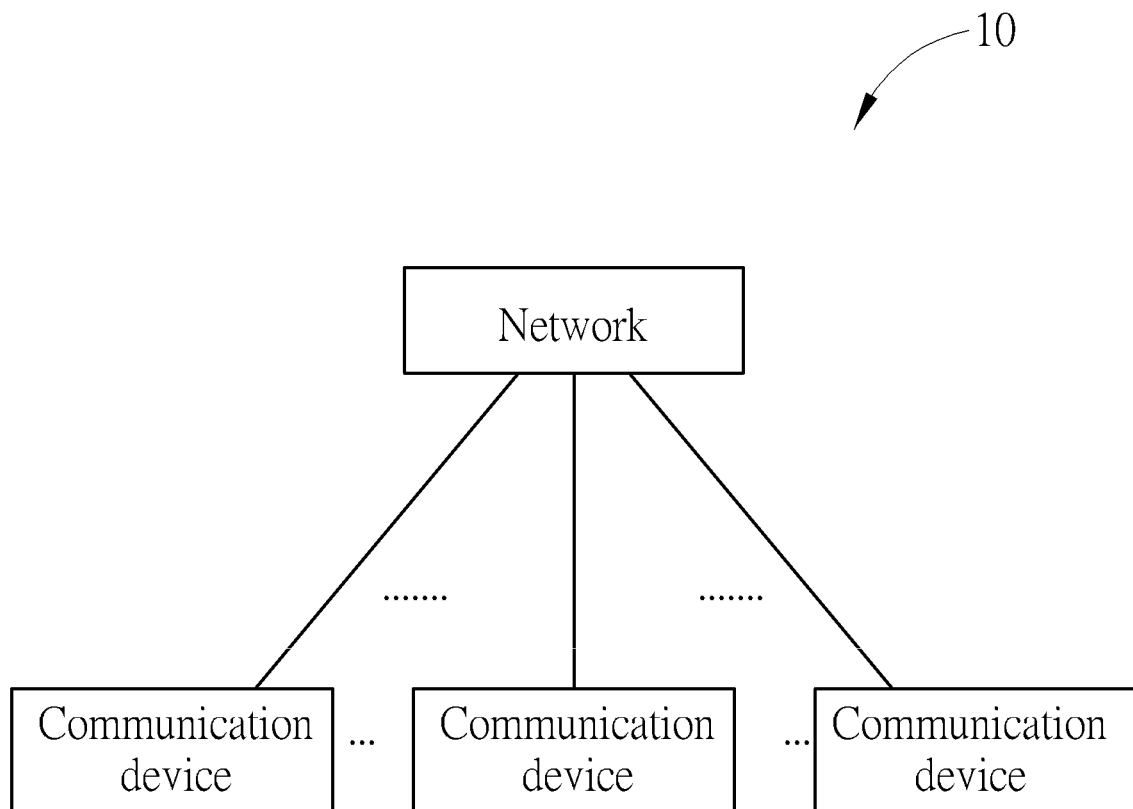
FIG. 1 is a schematic diagram of a wireless communication system 10 according to an embodiment of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). In FIG. 1, the network and the communication devices are simply utilized for illustrating the structure of the wireless communication system 10. Practically, the network may be an evolved UTRAN (E-UTRAN) including at least one evolved NB (eNB), and/or a next-generation NB (gNB), and/or at least one relay in a long term evolution (LTE) system, a LTE-Advanced (LTE-A) system or an evolution of the LTE-A system, e.g., a 5G NR system. The eNB or the relay may be termed as a base station.

Figure 2:
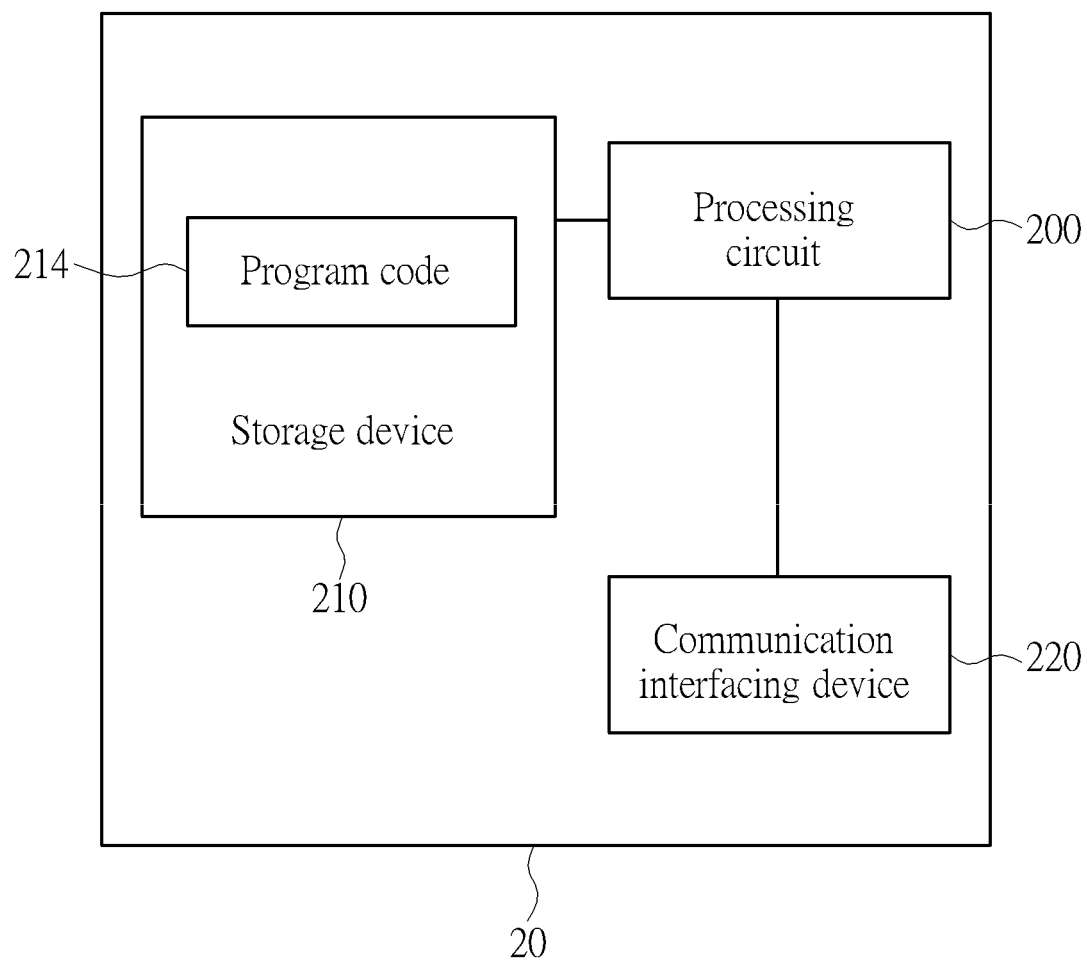
FIG. 2 is a schematic diagram of a communication device 20 according to one embodiment of the present invention.

FIG. 2 is a schematic diagram of a communication device 20 according to an example of the present invention. The communication device 20 can be a user equipment (UE) or the network shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), hard disk, and optical data storage device. The communication interfacing unit 220 is preferably a radio transceiver, and can transmit and receive wireless signals according to processing results of the processing means 200. The program code 214 implementing any of solutions above may be stored in the storage unit 210 and executed in the processing means 200.

Figure 3:
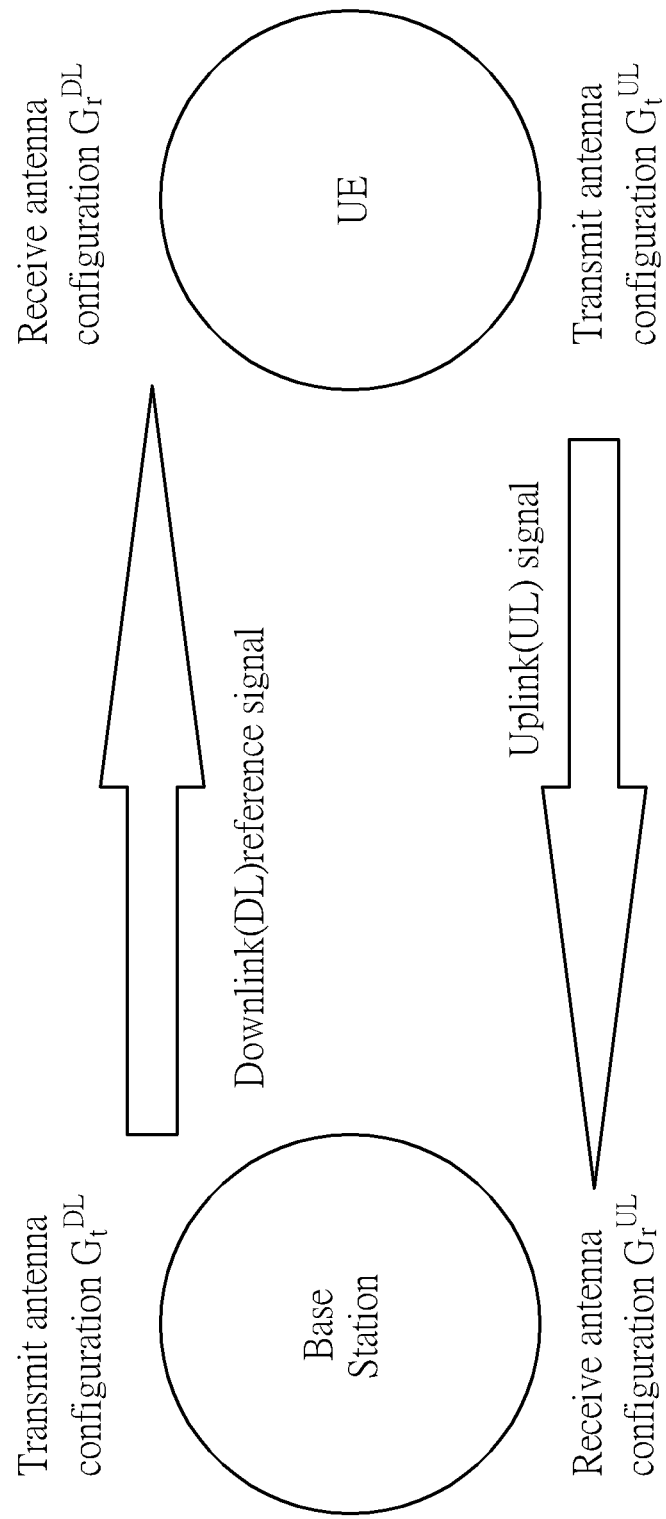
FIG. 3 illustrates gains of antenna configurations of UE and base station in uplink and downlink transmission.

To determine the transmit power, a base station transmits a DL reference signal to a UE using a first transmit antenna configuration for a purpose of path loss measurement. The gain of the first transmit antenna configuration gain is hereinafter denoted by $G_t^{DL}$. The UE receives the DL reference signal using a first receive antenna configuration. The gain of the first receive antenna configuration gain is hereinafter denoted by $G_r^{DL}$. The UE transmits an UL signal to the base station using a second transmit antenna configuration and an UL power control formula. The gain of the second transmit antenna configuration gain is hereinafter denoted by $G_t^{UL}$. The UE uses the UL power control formula to determine an UL transmit power for the UL signal. Procedures for determining the UL power control formula are elaborated in the following. The base station receives the UL signal using a second receive antenna configuration. The gain of the second receive antenna configuration gain is denoted by $G_r^{UL}$. An illustrative diagram is illustrated in FIG. 3. Specifically, the antenna configuration may comprise at least a beamforming configuration, and/or a beamformed signal configuration. In one embodiment, the beamformed signal configuration may comprise a configuration of a beamformed UL reference signal or an index of a beamformed UL reference signal. Furthermore, the index of the beamformed UL reference signal may be a sounding reference signal resource index (SRI) in one embodiment.

The antenna gains in following descriptions are all represented in dB scale. For example, let $\hat{G}_t^{DL}$ denote the gain of the first transmit antenna configuration in linear value. We have $G_t^{DL}=10\log_{10}(\hat{G}_t^{DL})$. Note that it is not precluded for the first transmit antenna configuration to be the same as the second receive antenna configuration. In other words, the base station uses the same antenna configuration for transmitting the DL reference signal to the UE and receiving the UL signal from the UE. And in this case we have $G_t^{DL}=G_r^{UL}$. Similarly, it is not precluded for the second transmit antenna configuration to be the same as the first receive antenna configuration. In this case, the UE uses the same antenna configuration for receiving the DL reference signal from the base station and transmitting the UL signal to the base station. And we have $G_r^{UL}=G_r^{DL}$.

The UL transmit power is determined based on a closed-loop (CL) power control parameter, an open-loop power control (CL) parameter and a path loss parameter. These parameters are associated with transmit antenna gain and receive antenna gain of the antenna configuration of the UE and the base station. During the communication, the base station may notify the UE of the antenna configuration used for the communication by sending control information to the UE. Accordingly, the UE determines the CL power control parameter, the OL power control parameter and the path loss parameter according to the antenna configuration, and thereby to determine the UL transmit power. Alternatively, the base station may directly determine the OL the CL power control parameter, the OL power control parameter and the path loss parameter according to the antenna configuration, and send the control information including the determined parameters to the UE. As such, the UE determines the UL transmit power according to the parameters determined and sent by the base station.

As mentioned above, the base station and the UE may comprise the storage unit 210 storing the program code 214 as illustrated in FIG. 2. The base station and the UE may also comprise the processing circuit 200. When the program code 214 executed by the processing circuit 200, the UE or the base station determines the above-identified parameters. Accordingly, the UE determine the UL transmit power and have an UL transmit power control on the communication interfacing unit 220.

Closed-Loop Control Using Dynamic Signaling

In one embodiment, the base station or the UE calculates a gain difference between the gain of the first transmit antenna configuration and the gain of the second receive antenna configuration, i.e., $(G_t^{DL}-G_r^{UL})$. This calculation can be directly achieved by the base station since the base station typically determines the antenna configuration for the UE. Alternatively, this can be achieved by the UE since the UE may be notified of the antenna configuration from the control information sent by the base station.

The base station or the UE determines a first closed-loop (CL) power control parameter for taking into account at least the above-mentioned gain difference. In one embodiment, the base station or the UE performs this calculation by first assuming a unity antenna gain for both the first transmit antenna configuration and the second receive antenna configuration. Then, the base station or the UE calculates a second CL power control parameter in a way analogous to that introduced in ""Physical Layer Procedures," 3GPP TS 36.213, V14.1.0, 2017-01" for LTE/LTE-A systems, where unity antenna gain is employed. Finally, the base station or the UE obtains the first CL power control parameter by combining the gain difference of antenna gain ($G_t^{DL}-G_r^{UL}$), and the second CL power control parameter.

If the CL power control parameter is determined by the base station, the base station will transmit the CL power control parameter to the UE using dynamic signaling in a DL control signal. The UE receives the DL control signal. The UE adjusts the UL transmit power for transmitting the UL signal following the first CL power control parameter in the DL control signal. In one embodiment, the UE determines the UL power following the UL power control formula as:

$$\min\begin{cases} P_{CMAX,c}(i) \\ 10\log_{10}(M_{PUSCH,c}(i)) + P_{O\_PUSCH,c}(j) + \alpha_c(j) \cdot PL_c + \Delta_{TF,c}(i) + \\ (f_c(i) + (G_t^{DL} - G_r^{UL})) \end{cases}$$

where $P_{CMAX,c}(i)$ is a transmit power limit for the UL signal taking into account other potential concurrent UL transmissions with higher priority (e.g., UL control signals), $f_c(i)+(G_t^{DL}-G_r^{UL})$ is the first CL power control parameter in the DL control signal transmitted by the base station (or determined by UE itself), the functionalities of the rest parameters are similarly defined as in the ""Physical Layer Procedures," 3GPP TS 36.213, V14.1.0, 2017-01".

The first CL power control parameter can be accumulative, which means the UE adjusts the UL power by simply adding the current UL transmit power and the first CL power control parameter transmitted from the base station (or determined by UE itself) in the dynamic DL control signal. Alternatively, the first CL power control parameter can be absolute, which means the UE negates the previous received CL power control parameter and apply the current received CL power control parameter.

In one embodiment, the UE may comprise different registers to record accumulated values of the first CL power control parameters with respect to different antenna configurations. Each register may hold an accumulated value of the first CL power control parameter with respect to a specific antenna configuration. When the antenna configuration changes, the UE may read accumulated value from a different register to determine the uplink transmit power.

Open-Loop Control Using Higher Layer Signaling

In one embodiment, the base station or the UE calculates again difference between the gain of the first transmit antenna configuration and the gain of the second receive antenna configuration, i.e. ($G_t^{DL}-G_r^{UL}$). Similarly to the determination of the CL power control parameter, this calculation can be directly achieved by the base station since the base station typically determines the antenna configuration for the UE. Alternatively, this can be achieved by the UE since the UE may be notified of the antenna configuration from the control information sent by the base station.

The base station or the UE determines a first UE-specific open-loop (OL) power control parameter for the UE taking into account at least the above-mentioned gain difference. In one embodiment, the base station or the UE performs this calculation by first assuming a unity antenna gain for both the first transmit antenna configuration and the second receive antenna configuration. Then, the base station or the UE calculates a second UE-specific OL power control parameter in a way analogous to that introduced in ""Physical Layer Procedures," 3GPP TS 36.213, V14.1.0, 2017-01" for LTE/LTE-A systems, where unity antenna gain is employed. Finally, the base station or the UE obtains the first UE-specific OL power control parameter by combining the difference of antenna gain ($G_t^{DL}-G_r^{UL}$), and the second UE-specific OL power control parameter.

If the OL power control parameter is determined by the base station, the base station transmits the UE-specific OL power control parameter to the UE using a higher layer signaling. The UE receives the higher layer signaling. The UE adjusts the UL transmit power for transmitting the UL signal by applying the first UE-specific OL power control parameter. In one embodiment, the UE determines the UL power following the UL power control formula as:

$$\min\begin{cases} P_{CMAX,c}(i) \\ 10\log_{10}(M_{PUSCH,c}(i)) + P_{O\_PUSCH,c}(j) + \alpha_c(j) \cdot PL_c + \Delta_{TF,c}(i) + \\ (f_c(i) + (G_t^{DL} - G_r^{UL})) \end{cases}$$

$$P_{O\_PUSCH,c}(j) = (P_{O\_UE\_PUSCH,c}(j) + G_t^{DL} - G_r^{UL}) + P_{O\_NOMINAL\_PUSCH,c}(j)$$

where ($P_{O\_UE\_PUSCH,c}(j)+G_t^{DL}-G_r^{UL}$) is the first UE-specific OL power control parameter in the higher layer signaling transmitted by the base station (or determined by UE itself), the functionalities of the rest parameters are similarly defined as in ""Physical Layer Procedures," 3GPP TS 36.213, V14.1.0, 2017-01".

Both BS and UE Account for Antenna Gain Difference I

In one embodiment, the UE calculates a first gain difference between the gain of the second transmit antenna configuration and the gain of the first receive antenna configuration, i.e., $G_r^{DL}-G_t^{UL}$. The base station calculates a second gain difference between the gain of the first transmit antenna configuration and the gain of the second receive antenna configuration, i.e., $G_t^{DL}-G_r^{UL}$. The base station then calculates a CL power control parameter using at least the second gain difference. The base station transmits the CL power control parameter to the UE using dynamic signaling in a DL control signal. The UE receives the DL control signal. The UE determines the UL power control formula using at least the first gain difference, and the CL power control parameter in the DL control signal. In one embodiment, the UE determines the UL power control formula as:

$$\min\begin{cases} P_{CMAX,c}(i) \\ 10\log_{10}(M_{PUSCH,c}(i)) + P_{O\_PUSCH,c}(j) + \alpha_c(j) \cdot PL_c + \Delta_{TF,c}(i) + \\ ((f_c(i) + (G_t^{DL} - G_r^{UL})) + G_r^{DL} - G_t^{UL}) \end{cases}$$

where $((f_c(i)+(G_t^{DL}-G_r^{UL}))$ is the CL power control parameter in the DL control signal transmitted by the base station, and $G_r^{DL}-G_t^{UL}$ is the first gain difference calculated by the UE. The UE then determines the UL transmit power for the UL signal following the UL power control formula.

Both BS and UE Account for Antenna Gain Difference Case II

In one embodiment, the UE calculates a first gain difference between the gain of the second transmit antenna configuration and the gain of the first receive antenna configuration, i.e. $G_r^{DL}-G_t^{UL}$. The base station calculates a second gain difference between the gain of the first transmit antenna configuration and the gain of the second receive antenna configuration, i.e. $G_t^{DL}-G_r^{UL}$. The base station then calculates a UE-specific OL power control parameter using at least the second gain difference. The base station transmits the UE-specific OL power control parameter to the UE using a higher layer signaling. The UE receives the higher layer signaling. The UE determines the UL power control formula using at least the first gain difference, and the UE-specific OL power control parameter in the higher layer signaling. In one embodiment, the UE determines the UL power control formula as:

$$\min\begin{Bmatrix}P_{CMAX,c}(i)\\10\log_{10}(M_{PUSCH,c}(i))+P_{O\_PUSCH,c}(j)+\alpha_c(j)\cdot PL_c+\Delta_{TF,c}(i)+\\(f_c(i)+(G_r^{DL}-G_t^{UL}))\end{Bmatrix}$$

$$P_{O\_PUSCH,c}(j)=(P_{O\_UE\_PUSCH,c}(j)+G_t^{DL}-G_r^{UL})+P_{O\_NOMINAL\_PUSCH,c}(j)$$

where $(P_{O\_UE\_PUSCH,c}(j)+G_t^{DL}-G_r^{UL})$ is the UE-specific OL power control parameter in the higher layer signaling transmitted by the base station, and $G_r^{UL}-G_t^{UL}$ is the first difference calculated by the UE. The UE then determines the UL transmit power for the UL signal following the UL power control formula.

According to various embodiment of the present invention, the above-mentioned "UL signal" could be regular user data, UL reference signal, or UL control signal. In additionally, The UE can also transmit a power headroom report to the base station to report the remaining available power for performing UL transmission using the UL power control formula proposed in the above descriptions.

In summary, disclosed embodiments of the present invention provides manners to determine the uplink power control for the UE in a next generation cellular communications systems, such as 5G New Radio system. As the next generation cellular communications systems uses adopts the beamforming technology, the disclosed embodiments of the present invention introduces calculations on transmit and receive antenna gains of the antenna configuration into the determination of the uplink transmit power control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a user equipment (UE) to perform uplink transmit power control, comprising:
receiving, from a base station, a control information comprising at least a UE antenna configuration, wherein the UE antenna configuration comprises at least a sounding reference signal resource index (SRI);
receiving a downlink reference signal from the base station;
determining an open-loop (OL) power control parameter according to the UE antenna configuration;
determining a path loss parameter according to the UE antenna configuration and the downlink reference signal;
determining uplink transmit power of at least one uplink signal based on at least one of the control information, the OL power control parameter, and the path loss parameter; and
transmitting the at least one uplink signal with the determined uplink transmit power to the base station.

2. A user equipment (UE), comprising:
a communication interfacing unit, arranged to receive, from a base station, a control information comprising at least a UE antenna configuration, wherein the UE antenna configuration comprises at least a sounding reference signal resource index (SRI), wherein the communication interfacing unit is further arranged to receive a downlink reference signal from the base station;
a storage unit, arranged to store program code; and
a processing circuit, arranged to execute the program code thereby to perform steps of:
determining an open-loop (OL) power control parameter according to the UE antenna configuration;
determining a path loss parameter according to the UE antenna configuration and the downlink reference signal; and
determining uplink transmit power of at least one uplink signal based on at least one of the control information, the OL power control parameter, and the path loss parameter, wherein the communication interfacing unit is further arranged to transmit the at least one uplink signal with the determined uplink transmit power to the base station.

3. The UE of claim 2, wherein the processing circuit is arranged to execute the program code thereby further to perform at least one step of:
determining a closed-loop (CL) power control parameter according to the UE antenna configuration.

4. The UE of claim 3, wherein the processing circuit is arranged to execute the program code thereby further to perform steps of:
calculating a gain difference between a transmit antenna gain and a receive antenna gain of the base station according to the UE antenna configuration;
determining a second CL power control parameter by assuming the transmit antenna gain and the receive antenna gain of the base station as unity; and
combining the gain difference between the transmit antenna gain and the receive antenna gain of the base station and the second CL power control parameter thereby to obtain a first CL power control parameter.

5. The UE of claim 4, wherein the processing circuit is arranged to execute the program code thereby to further perform steps of:
determining a gain difference between a receive antenna gain and a transmit antenna gain of the UE according to the UE antenna configuration; and
determining the transmit power according to the determined CL power parameter and the gain difference between the receive antenna gain and the transmit antenna gain of the UE.

6. The UE of claim 2, wherein the processing circuit is arranged to execute the program code thereby to further perform steps of:
calculating a gain difference between a transmit antenna gain and a receive antenna gain of the base station according to the UE antenna configuration;
determining a second UE-specific OL power control parameter by assuming the transmit antenna gain and the receive antenna gain of the base station as unity; and
combining the gain difference between the transmit antenna gain and the receive antenna gain of the base station and the second UE-specific OL power control parameter thereby to obtain a first UE-specific OL power control parameter.

7. The UE of claim 6, wherein the processing circuit is arranged to execute the program code thereby to further perform steps of:
  determining a gain difference between a receive antenna gain and a transmit antenna gain of the UE according to the UE antenna configuration; and
  determining the uplink transmit power according to the determined OL power control parameter and the gain difference between the receive antenna gain and the transmit antenna gain of the UE.

* * * * *